US012745083B2

(12) United States Patent
Qiu et al.

(10) Patent No.: US 12,745,083 B2
(45) Date of Patent: Sep. 22, 2026

(54) SECURITY PARAMETER UPDATES DURING CELL-RESELECTION FOR NR SDT

(71) Applicant: Telefonaktiebolaget LM Ericsson (publ), Stockholm (SE)

(72) Inventors: Liwei Qiu, Täby (SE); Yazid Lyazidi, London (GB); Jan Christoffersson, Luleå (SE); Henrik Enbuske, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 295 days.

(21) Appl. No.: 18/558,077

(22) PCT Filed: May 1, 2022

(86) PCT No.: PCT/SE2022/050419

§ 371 (c)(1),
(2) Date: Oct. 30, 2023

(87) PCT Pub. No.: WO2022/240333

PCT Pub. Date: Nov. 17, 2022

(65) Prior Publication Data

US 2024/0214808 A1 Jun. 27, 2024

Related U.S. Application Data

(60) Provisional application No. 63/186,383, filed on May 10, 2021.

(51) Int. Cl.
*H04W 12/069* (2021.01)
*H04W 12/03* (2021.01)
*H04W 76/27* (2018.01)

(52) U.S. Cl.
CPC ......... *H04W 12/069* (2021.01); *H04W 12/03* (2021.01); *H04W 76/27* (2018.02)

(58) Field of Classification Search
CPC ... H04W 12/069; H04W 12/03; H04W 76/27; H04W 8/00; H04W 12/043; H04W 76/19
See application file for complete search history.

(56) References Cited

U.S. PATENT DOCUMENTS

2019/0320316 A1* 10/2019 Mildh ..................... H04W 8/00
2019/0320488 A1* 10/2019 Mildh ................... H04W 76/27
(Continued)

FOREIGN PATENT DOCUMENTS

WO 2021025246 A1 2/2021

OTHER PUBLICATIONS

Khlass et al., "Efficient Handling of Small Data Transmission for RRC Inactive UEs in 5G Networks," 2021 IEEE 93rd Vehicular Tech. Conf. (VTC2021-Spring) (Year: 2021).*
(Continued)

*Primary Examiner* — Kathy W Wang-Hurst
*Assistant Examiner* — Garth D Richmond
(74) *Attorney, Agent, or Firm* — Murphy, Bilak & Homiller, PLLC

(57) ABSTRACT

Methods and apparatuses for User Equipment (UE) context transitions in cell reselections. A method performed by a new serving network node for UE context transitions in cell reselection comprises receiving a Radio Resource Control (RRC) connection resume message from the UE. The method further comprises transmitting a retrieve UE context request to a last serving network node, requesting the retrieval of the UE access stratum context, and receiving a response from the last serving network node to the retrieve UE context request.

10 Claims, 11 Drawing Sheets

(56) References Cited

U.S. PATENT DOCUMENTS

| | | | | |
|---|---|---|---|---|
| 2021/0051734 | A1* | 2/2021 | Chang | H04W 12/033 |
| 2022/0086899 | A1* | 3/2022 | Shih | H04L 5/0053 |
| 2022/0304093 | A1* | 9/2022 | Kim | H04W 76/19 |
| 2024/0179533 | A1* | 5/2024 | Mildh | H04W 12/04 |

OTHER PUBLICATIONS

"3rd Generation Partnership Project; Technical Specification Group Services and System Aspects; Security architecture and procedures for 5G system (Release 17)", 3GPP TS 33.501 V17.1.0, Mar. 2021, 256 pages.

"3rd Generation Partnership Project; Technical Specification Group Radio Access Network; NG-RAN; NG Application Protocol (NGAP) (Release 16)", 3GPP TS 38.413 V16.5.0, Apr. 2021, 473 pages.

"3rd Generation Partnership Project; Technical Specification Group Radio Access Network; NG-RAN; Xn application protocol (XnAP) (Release 16)", 3GPP TS 38.423 V16.5.0, Apr. 2021, 461 pages.

"Report of [Post113-e][503][SDT] T319, cell reselection and re-establishment", 3GPP RAN WG2 Meeting #113bis-e, R2-2103971, InterDigital (email discussion rapporteur), eMeeting, Apr. 12-20, 2021, 33 pages.

"Work Item on NR smalldata transmissions in Inactive state", 3GPP TSG RAN Meeting #91e RP-210870 (update of RP-201305), ZTE Corporation, e-meeting, 2021, 5 pages.

3GPP , "3rd Generation Partnership Project; Technical Specification Group Radio Access Network; NR; Radio Resource Control (RRC) protocol specification (Release 16)", 3GPP TS 38.331 V16.4.1, Mar. 2021, 1-949.

"Small data transmission with RA-based schemes", 3GPP TSG-RAN WG2 Meeting #111-e, R2-2006583, Huawei, HiSilicon, E-meeting, Aug. 17-28, 2020.

* cited by examiner

Transmit a message to a network node comprising security parameters

502

SECURITY PARAMETER UPDATES DURING CELL-RESELECTION FOR NR SDT

TECHNICAL FIELD

Embodiments of the present disclosure relate to methods, User Equipments (UEs) and base stations, and particularly methods, UEs and base stations for supporting UE context transitions in cell reselections.

BACKGROUND

The following are aims and/or subjects of study for New Radio (NR) Small Data Transmissions (SDT) in Radio Resource Control (RRC) inactive (RRC_INACTIVE) states: UUL small data transmissions for RACH-based schemes (i.e. 2-step and 4-step RACH):

General procedure to enable transmission of small data packets from INACTIVE state (e.g. using MSGA or MSG3) [RAN2].

Enable flexible payload sizes larger than the Rel-16 CCCH message size that is possible currently for INACTIVE state for MSGA and MSG3 to support UP data transmission in UL (actual payload size can be up to network configuration) [RAN2]

Context fetch and data forwarding (with and without anchor relocation) in INACTIVE state for RACH-based solutions [RAN2, RAN3].

The security aspects of the above solutions are to be reviewed.

Transmission of UL data on pre-configured PUSCH resources (i.e. reusing the configured grant type 1)—when Transmission Authorization (TA) is valid:

General procedure for small data transmission over configured grant type 1 resources from INACTIVE state [RAN2]

Configuration of the configured grant type1 resources for small data transmission in UL for INACTIVE state [RAN2].

Specify RRM core requirements for small data transmission in RRC_INACTIVE, if needed [RAN4].

The above aims and/or subjects of study should not require the introduction of a new RRC state. Transmission of smalldata in UL, subsequent transmission of smalldata in UL and DL and the state transition decisions should be under network control. A focus of study may be on licensed carriers and the solutions may be reused for New Radio Unlicensed (NR-U) if applicable. Specify configuring of SRB1 and SRB2 for small data transmission in RRC_INACTIVE state by reusing the framework for DRBs. Any associated specification work in RAN1 that is needed to support the above set of objectives may also be studied.

For Narrowband Internet of Things (NB-IOT) and Long Term Evolution for Machines (LTE-M), similar signaling optimizations for small data have been introduced through Rel-15 Early Data Transmission (EDT) and Rel-16 Preconfigured Uplink Resources (PUR). Somewhat similar solutions may be expected for NR with the difference that the Rel-17 NR Small Data is only to be supported for RRC INACTIVE state, includes also 2-step RACH based small data, and that it may also include regular complexity Mobile Broadband (MBB) UEs. Both support mobile originated (MO) traffic only.

Within the context of Small Data Transmission (SDT) the possibility of transmitting subsequent data is under consideration, meaning transmission of further segments of the data that cannot fit in the Msg3 Transport Block. Such segments of data may be transmitted either in RRC_CONNECTED as in legacy after the 4-step RACH procedure has been completed, or they may be transmitted in RRC_INACTIVE before the UE transitions to RRC_CONNECTED. In the former case the transmission will be more efficient as the gNB and UE are appropriately configured based on the current UE channel conditions, while in the latter case several optimization are not in place yet, especially if the UE has moved while not connected, and also the transmission may collide with the transmission from other UEs as the contention has not been resolved yet.

The following extract, from R2-2103971, available at https://portal.3gpp.org/ngppapp/TdocList.aspx?meetingId=39300 as of 10 May 2021, considered the possible cell reselection scenario for SDT as follows.

R2-2103971 Report of [Post113-e][503][SDT] T319, cell reselection and re-establishment InterDigital discussion Rel-17 NR_SmallData_INACTIVE-Core Proposal 7

Intel thinks that we should discuss further whether the UE goes to Idle or stays in INACTIVE.

LG thinks this is a corner case and we shouldn't optimize behaviour. Ericsson, Lenovo, vivo, oppo, QC, agrees with LG.

ZTE thinks that we shouldn't use different mechanisms and using the same behaviour as 6. Samsung doesn't think proposal 7 depends on 6 as it depends on SA3.

=<Noted

| Agreements: |
|---|
| 1. SDT failure detection timer is started upon initiation of SDT procedure |
| 2. T319 legacy is not started if RRCResumeRequest or RRCResumeRequest1 is transmitted . . . |
| 3. T319 legacy stop conditions also apply to SDT failure detection timer |
| 4. RRC re-establishment procedure is not supported for SDT |
| 5. An LS is sent to SA3 to verify feasibility/impacts of re-using same NCC/I-RNTI value temporarily for RRC Resume procedure in new cell during SDT procedure (include same cell question from 502] |
| 6. FFS-RAN2 to select between the following options for cell re-selection during ongoing SDT procedure next meeting: 1) UE transitions to IDLE, possibly performing high-layer retransmission (8/25); or 2) UE remains in INACTIVE and sends RRC Resume to new cell |
| 7. FFS Upon SDT failure detection timer expiry, the same procedure as T319 expiry is used (e.g. transition to IDLE as in the case of expiry of the T319 timer and attempts RRC connection setup) (18/8) |

Requires Online Discussion for Next Meeting

Proposal 3: RAN2 to decide whether SDT failure detection timer: 1) has an extended duration to accommodate subsequent SDT (13/25); or 2) is restarted upon (re)transmission or reception of small data (12/25) [CB next Tuesday or postpone it to next meeting]

There currently exist certain challenge(s). In case of a cell reselection during a SDT procedure, the UE context could be lost due to context relocation to another network node while the new RRCResumeRequest message is routed to the old anchor network node. This is because the context, which is originally stored in the last serving network node, is relocated to the cell where the UE starts its SDT procedure (for example see cell A of FIG. 1), i.e. sends the RRCResumeRequest. If the UE does a cell re-selection (for example to cell B of FIG. 1) before the SDT procedure is completed, i.e. before an RRCRelease message is received, it will start a new SDT procedure in the new cell. The new SDT procedure will try to fetch the UE context from the last serving cell, but at this point the context has been relocated (to cell A), and the fetch procedure and hence the SDT procedure will fail. Although options may be considered to store the UE context when the UE is kept in the INACTIVE state, issue may remain as in principle the same security parameters should not be used in the two sets of Retrieve UE Context procedures. Currently there is no standardized way to solve this security issue. FIG. 1 is a sequence diagram of a potential cell reselection problem as discussed above.

RP-210870, "Updated Work Item on NR small data transmissions in INACTIVE state", available at https://www.3gpp.org/ftp/tsg_ran/TSG_RAN/TSGR_91e/Docs as of 31 Mar. 2022, discusses enabling small data transmissions in RRC_INACTIVE states.

TS 38.423, v16.5.0, "Xn application protocol (XnAP)", available at https://portal.3gpp.org/desktopmodules/Specifications/SpecificationDetails.aspx?specificationId=3228 as of 31 Mar. 2022, specifies the radio network layer signalling procedures of the control plane between NG-RAN nodes in NG-RAN.

TS 38.413, v16.5.0, "NG Application Protocol (NGAP)", available at https://portal.3gpp.org/desktopmodules/Specifications/SpecificationDetails.aspx?specificationId=3223 as of 31 Mar. 2022, specifies the radio network layer signalling protocol for the NG interface.

TS 38.331, v16.4.1, "Radio Resource Control (RRC) protocol specification", available at https://portal.3gpp.org/desktopmodules/Specifications/SpecificationDetails.aspx? specificationId=3197 as of 31 Mar. 2022, specifies the Radio Resource Control protocol for the radio interface between UE and NG-RAN.

SUMMARY

It is an object of the present disclosure to provide methods and apparatus for supporting UE context transitions in cell reselections that provide increased security.

Embodiments of the disclosure aim to provide methods and apparatus that alleviate some or all of the challenges identified herein.

An embodiment of the disclosure provides a method performed by a UE for UE context transitions in cell reselection. The method comprises obtaining plural sets of security parameters, and initiating a first RRC connection resume procedure using a first set of security parameters from among the plural sets of security parameters. The method further comprises initiating a second RRC connection resume procedure using a second set of security parameters from among the plural sets of security parameters.

A further embodiment of the disclosure provides a method performed by a new serving network node for UE context transitions in cell reselection. The method comprises receiving a RRC connection resume message from a UE. The method further comprises transmitting a retrieve UE context request to a last serving network node, requesting the retrieval of the UE access stratum context. The method also comprises receiving a response from the last serving network node to the retrieve UE context request.

A further embodiment of the disclosure provides a method performed by a last serving network node for UE context transitions in cell reselection. The method comprises receiving a retrieve UE context request from a new serving network node, requesting the retrieval of the UE access stratum context. The method further comprises responding to the retrieve UE context request.

A further embodiment of the disclosure provides a method performed by a Core Network (CN) node. The method comprises transmitting a message to a network node comprising security parameters.

Further embodiments provide UEs, network nodes, CN nodes and communication systems comprising one or more of UEs, network nodes and/or CN nodes configured to perform methods in accordance with embodiments.

Certain aspects of the disclosure and their embodiments may provide solutions to these or other challenges. Aspects of the disclosure may provide methods to avoid security issues for lossless UE context transition during cell reselection of small data.

Aspects may facilitate an old RAN node to send an additional set of Access Stratum (AS) security information in the UE context to the new RAN node if the UE in RRC_INACTIVE state re-selects the cell.

According to aspects of the disclosure a Core Network (CN) node may send an additional set of AS security information to the RAN node if the UE in RRC_INACTIVE state re-selects the cell.

According to aspects of the disclosure, the CN node and the old RAN node may send additional security parameters to the new RAN node to secure the communication for the UE during an ongoing SDT procedure.

According to aspects of the disclosure, the small data transmission (SDT) may include security information that the target NG-RAN node can send to the source NG-RAN node for verifying the authenticity of the UE and the target NG-RAN node.

Certain aspects may provide one or more of the following technical advantage(s). Aspects may provide a simple way to ensure security for lossless UE context transition in case of cell re-selection for SDT.

Aspects may re-use existing Xn-AP and NG-AP signalings. Aspects may be implemented with little impact on UE side.

BRIEF DESCRIPTION OF DRAWINGS

For better understanding of the present disclosure, and to show how it may be put into effect, reference will now be made, by way of example only, to the accompanying drawings, in which.

ADDITIONAL EXPLANATION

Some of the aspects and embodiments contemplated herein will now be described more fully with reference to the accompanying drawings. Aspects and embodiments are provided by way of example to convey the scope of the subject matter to those skilled in the art.

Figure 1:
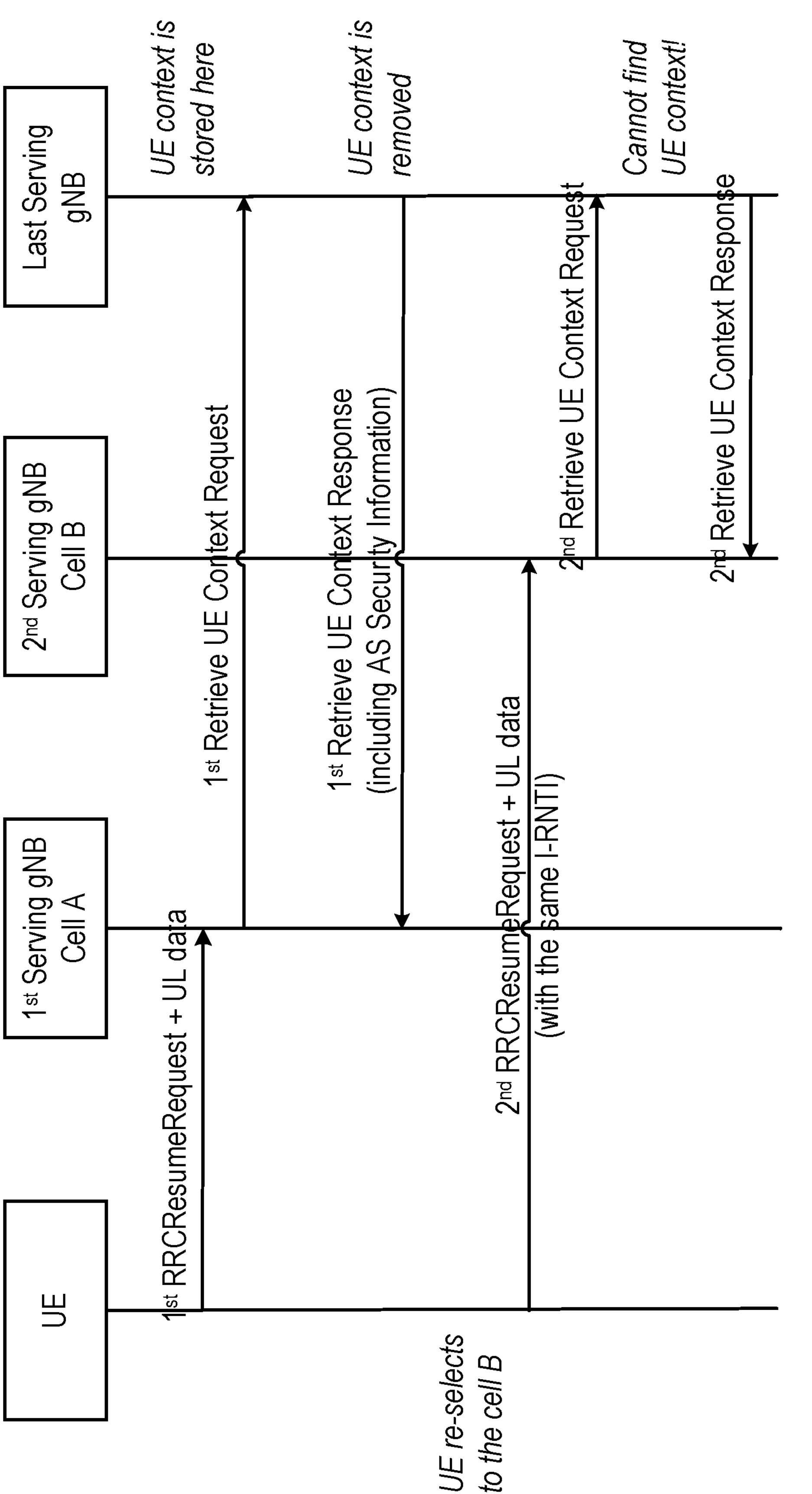
FIG. 1 is a sequence diagram showing an example of cell reselection during a SDT procedure.
Figure 2:
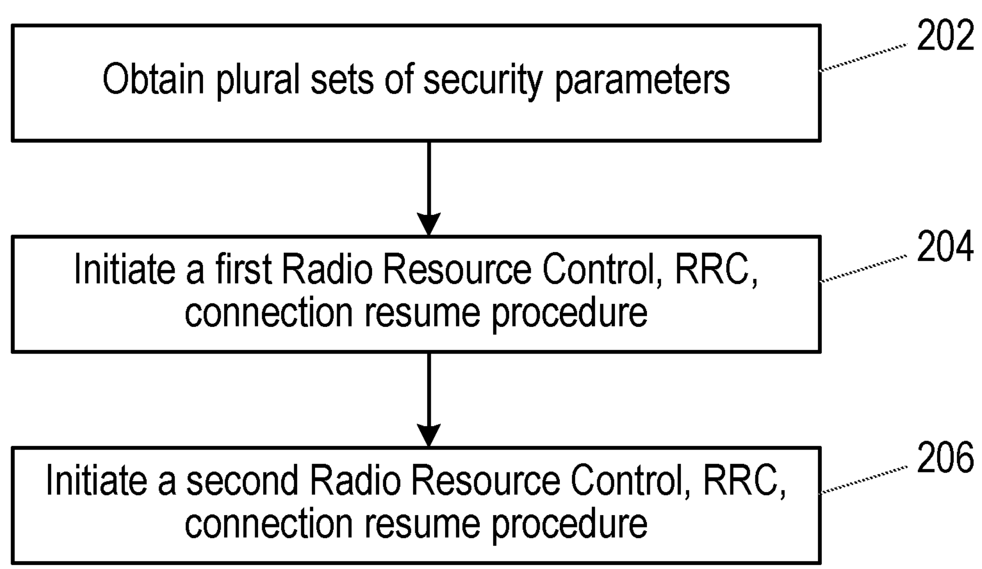
FIG. 2 is a flowchart showing a method in accordance with some embodiments.

FIG. 2 depicts a method in accordance with particular embodiments. The method 2 may be performed by a UE or wireless device (e.g. the UE 812 or UE 900 as described later with reference to FIGS. 8 and 9 respectively). The method begins at step 202 with the obtaining of plural sets of security parameters. The method continues at step 204 with the initiating of a first Radio Resource Control, RRC, connection resume procedure. The method continues at step 206 with the initiating of a second Radio Resource Control, RRC, connection resume procedure.

Figure 3:
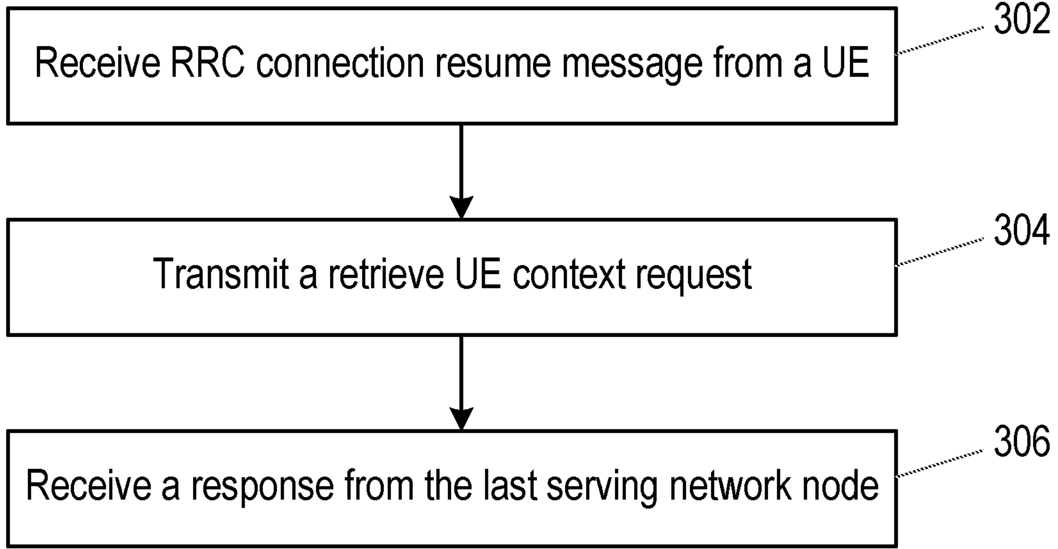
FIG. 3 is a flowchart showing a method in accordance with some embodiments.

FIG. 3 depicts a method in accordance with particular embodiments. The method 3 may be performed by a network node (e.g. the network node 810 or network node 1000 as described later with reference to FIGS. 8 and 10 respectively). The method begins at step 302 with the step of receiving a RRC connection resume message from a UE. The method continues at step 304 with the transmitting of a retrieve UE context request to a last serving network node, requesting the retrieval of the UE access stratum context. The method continues at step 306 with the receiving of a response from the last serving network node to the retrieve UE context request.

Figures 4, 5:
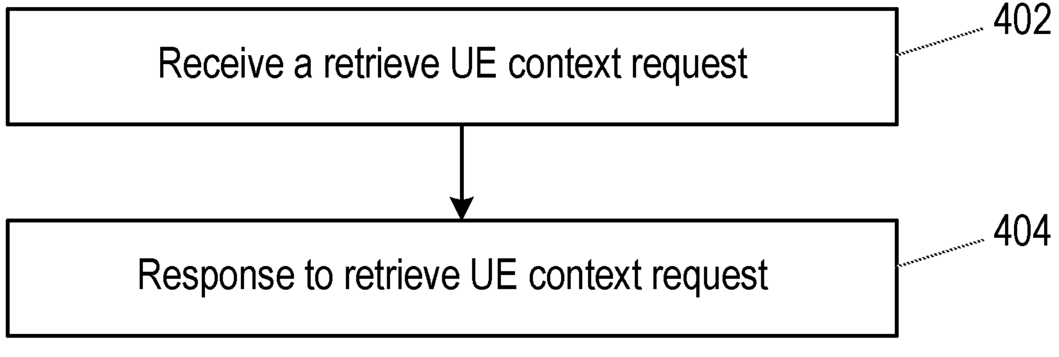
FIG. 4 is a flowchart showing a method in accordance with some embodiments.
FIG. 5 is a flowchart showing a method in accordance with some embodiments.

FIG. 4 depicts a method in accordance with particular embodiments. The method 4 may be performed by a network node (e.g. the network node 810 or network node 1000 as described later with reference to FIGS. 8 and 10 respectively). The method begins at step 402 with the reception of a retrieve UE context request from a new serving network node, requesting the retrieval of the UE access stratum context. The method continues at step 404 with responding to the retrieve UE context request.

FIG. 5 depicts a method in accordance with particular embodiments. The method 5 may be performed by a Core Network node (e.g. the core network node 806 or core network node 808 as described later with reference to FIG. 8). The method begins at step 502 with the transmission of a message to a network node comprising security parameters.

Figure 6:
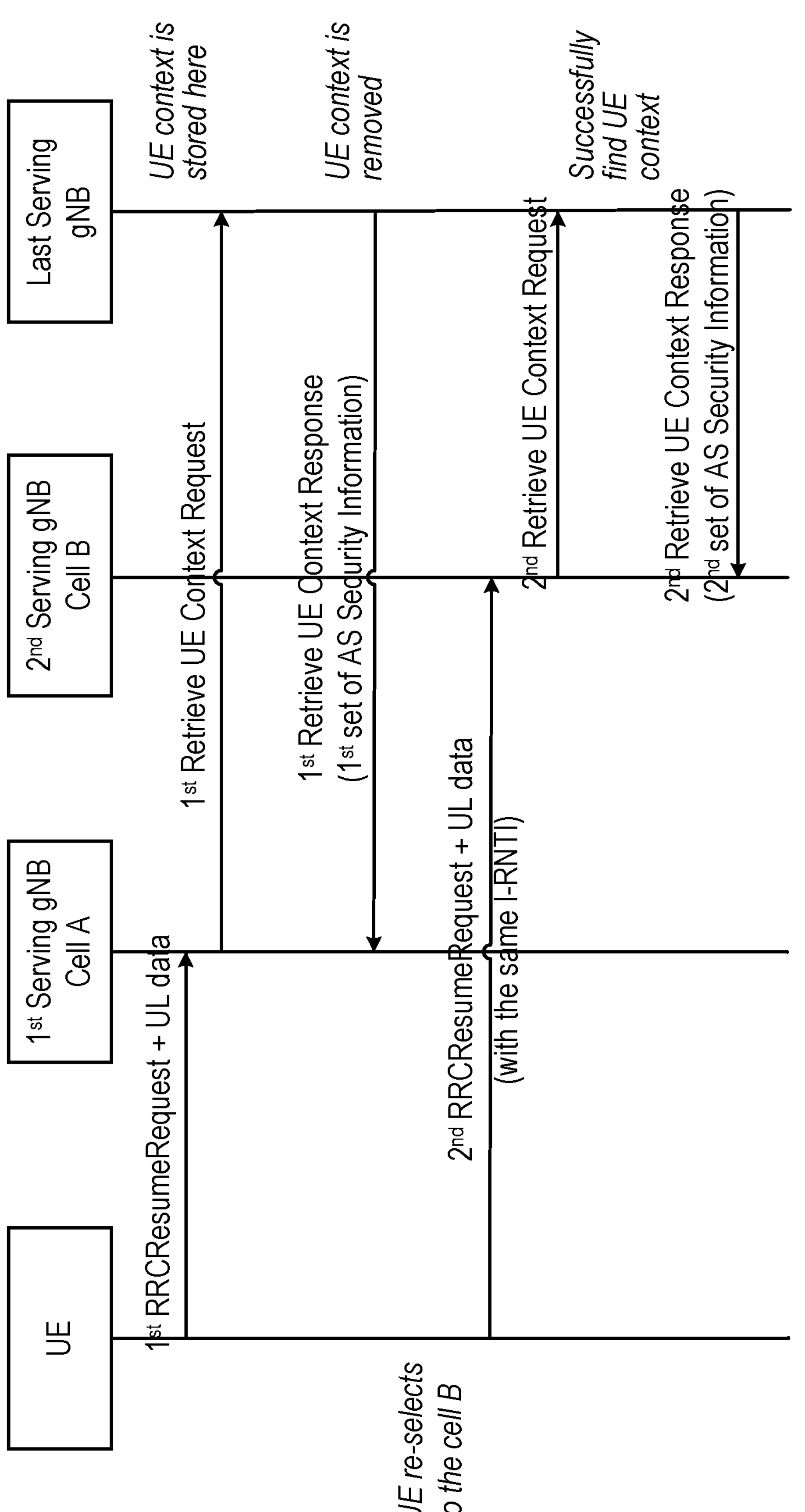
FIG. 6 is a sequence diagram showing cell reselection during SDT procedure over Xn in accordance with some embodiments.

An example of cell re-selection during SDT procedure according to an aspect of the disclosure is given in FIG. 6.

Aspects of the disclosure provide methods executed by first new serving network node (e.g. of cell A in FIG. 6), the methods comprising: receiving an RRCResumeRequest message from the UE. This message contains a request for the resumption of a suspended RRC connection or to perform an RAN based notification area (RNA) update. The method further comprises transmitting a request, e.g., RETRIEVE UE CONTEXT REQUEST, to a last serving network node for context retrieval of the UE AS context. The method further comprises receiving a response from the last serving network node where the UE context fetch is accepted or rejected.

In some aspects, the last serving network node may accept the UE context retrieval that the first new network node has requested. The acceptance may be indicated by the new network node receiving an acknowledge message, e.g. a RETRIEVE UE CONTEXT RESPONSE message. Some context and/or data may be is provided. E,g. The AS security information (e.g., $K_{NG\text{-}RAN}$*, NCC) is included in the RETRIEVE UE CONTEXT RESPONSE message.

In some aspects, the last serving network node may accept the UE context retrieval that the first new network node has requested but not accept the request to keep the context. The acceptance and rejection to keep the context may be indicated by the new network node receiving an acknowledge message, e.g. a RETRIEVE UE CONTEXT RESPONSE message. The AS security information (e.g., $K_{NG\text{-}RAN}$*, NCC) is included in the RETRIEVE UE CONTEXT RESPONSE message.

In some aspects the old network node does not accept the UE context retrieval that the new network node has requested.

Aspects of the disclosure provide methods executed by second new serving network nodes (e.g. of cell B in FIG. 6). The methods comprise: receiving a new RRCResumeRequest message with the same I-RNTI from the UE after it has performed cell re-selection. This message may contain a request for the resumption of a suspended RRC connection or to perform an RNA update. The method further comprises transmitting a request to a last serving network node for context retrieval of the UE AS context. The method further comprises receiving a response from the last serving network node where the UE context fetch is accepted or rejected.

In some aspects, the last serving network node may accept the UE context retrieval that the first new network node has requested. The acceptance may be indicated by the new network node receiving an acknowledge message, e.g. a RETRIEVE UE CONTEXT RESPONSE message. Some context and/or data may be provided. In some aspects, a secondary set of AS security information (e.g., KNG-RAN*, NCC) is included in the RETRIEVE UE CONTEXT RESPONSE message.

In some aspects the old network node may not accept the UE context retrieval that the new network node has requested.

Aspects of the disclosure provide methods executed by third network nodes (e.g. of last serving gNB in FIG. 6). The methods comprise: receiving a RETRIEVE UE CONTEXT REQUEST with the new indicator or an extension of existing indicator to keep the UE context for certain period.

In some aspects the last serving network node may accept the UE context retrieval requested by the first new serving node, and may send an acknowledge message, e.g. a RETRIEVE UE CONTEXT RESPONSE message, and keep the UE context for the period indicated by the new time indicator. Some context and/or data may be provided. In some aspects, a secondary set of AS security information (e.g., KNG-RAN*, NCC) may be included in the RETRIEVE UE CONTEXT RESPONSE message.

Where the last serving network node accepts the UE context retrieval requested by the first new serving node but not the request to keep the context, it may send an acknowledge message, e.g. a RETRIEVE UE CONTEXT RESPONSE message. In some aspects, a secondary set of AS security information (e.g., KNG-RAN*, NCC) may be included in the RETRIEVE UE CONTEXT RESPONSE message.

In some aspects where the last serving gNB does not accept the UE context retrieval, it may send a failure message and ignore the time indicator.

Figure 7:
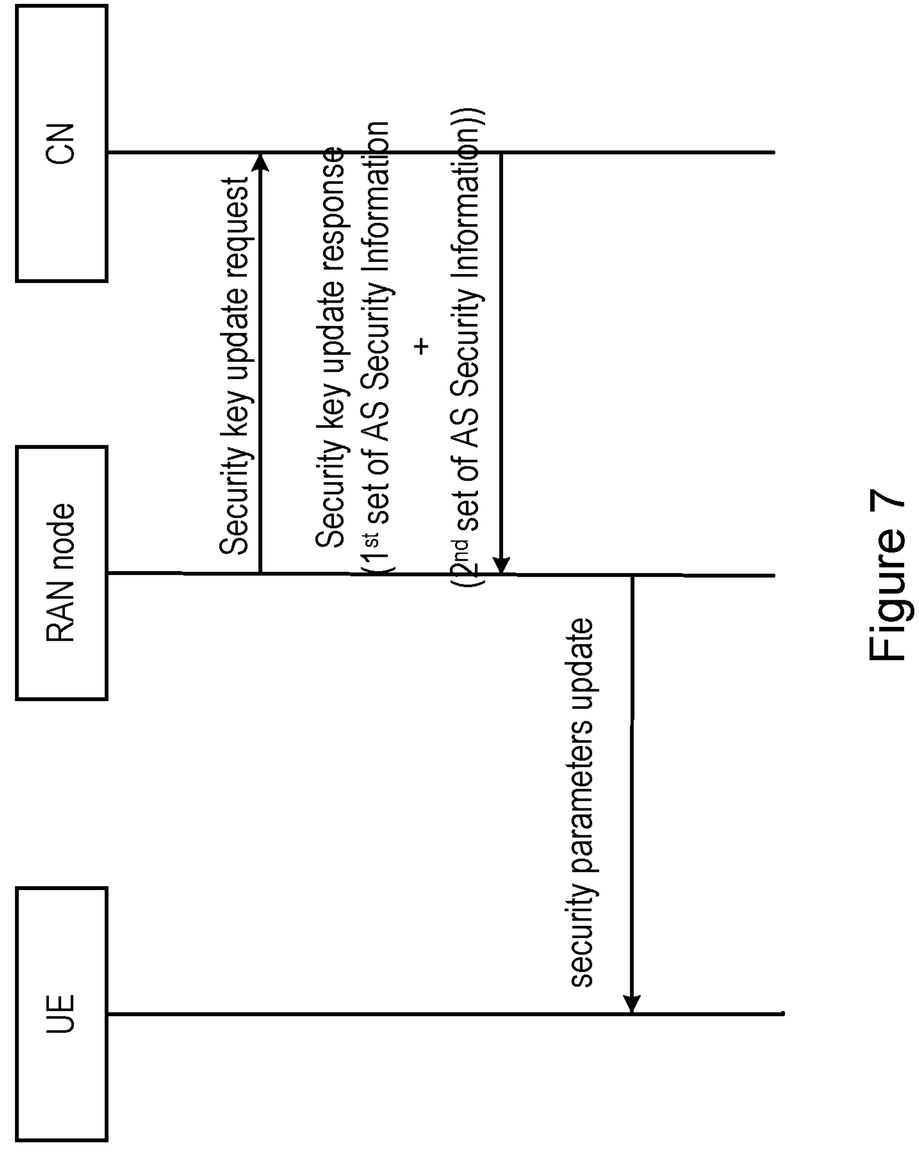
FIG. 7 is a sequence diagram showing a security key update over NG in accordance with some embodiments.

An example of cell re-selection during SDT procedure according to an aspect of the disclosure is given in FIG. 7.

Aspects of the disclosure provide methods executed by core network nodes (e.g., AMF), the methods comprising: potentially receiving a message from the second network node (e.g., NG-RAN node) to request for security information, wherein the message may be Path Switch Request, UE context Suspend, or UE Context Resume message; transmitting a message to the second network node (e.g., NG-RAN node) with security parameters, wherein the message could be Handover Request, Path Switch Request Acknowledge, UE context Suspend Response, or UE Context Resume Response message, and wherein at least one additional set of security parameters may be included, e.g., 2nd NCC, 2nd NH.

In some aspects the first network node (e.g., AMF) may also calculate multiple keys, such as Small Data Transmission, SDT, New Radio base station, gNB, keys (SDT_gNB_AMF) wherein one key may be intended for each RAN node, e.g., target NG-RAN node). The first network node (e.g., AMF) may then provide those to target NG-RAN nodes during CN paging. This may enable the target NG-RAN node to protect the DL data.

Aspects of the disclosure provide methods executed by UEs. The UEs may also calculate the SDT_KgNB same as the source NG-RAN node. The calculation of SDT_KgNB may be based on currently active AS security context, like KgNB and use the property of source NG-RAN node, target NG-RAN node, or ongoing SDT communication. The RRC connection resume procedure may use an authentication code, which may be the shortResume Message Authentication Code—Integrity (MAC-I).

Non-limiting examples of new indicators in TS 38.413 and 38.423 for security information are given below. In the AS Security Information of TS 38.423, the new indicators are the Secondary Key NG-RAN Star and Secondary Next Hop Chaining Count. In the Security Context of TS 38.413, the new indicators are the Secondary Next Hop Chaining Count and the Secondary Next-Hop NH

TS 38.423:

9.2.3.50 AS Security Information

The AS Security Information IE is used to generate the key material to be used for AS security with the UE.

| IE/Group Name | Presence | Range | IE Type and Reference | Semantics Description |
|---|---|---|---|---|
| Key NG-RAN Star | M | | BIT STRING (256) | $K_{NG-RAN}$* defined in TS 33.501 [28]. |
| Next Hop Chaining Count | M | | INTEGER (0 . . . 7) | Next Hop Chaining Count (NCC) defined in TS 33.501 [28] |
| Secondary Key NG-RAN Star | O | | BIT STRING (256) | $K_{NG-RAN}$* defined in TS 33.501 [28]. |
| Secondary Next Hop Chaining Count | O | | INTEGER (0 . . . 7) | Next Hop Chaining Count (NCC) defined in TS 33.501 [28] |

TS 38.413:

Security Context 9.3.1.88

This IE provides security related parameters to the NG-RAN node which are used to derive security keys for user plane traffic and RRC signalling messages and for security parameter generation for subsequent mobility, see TS 33.501 [13].

| IE/Group Name | Presence | Range | IE type and reference | Semantics description |
|---|---|---|---|---|
| Next Hop Chaining Count | M | | INTEGER (0 . . . 7) | Next Hop Chaining Counter (NCC) defined in TS 33.501 [13]. |
| Next-Hop NH | M | | Security Key 9.3.1.87 | The NH together with the NCC is used to derive the security configuration as defined in TS 33.501 [13]. |
| Secondary Next Hop Chaining Count | M | | INTEGER (0 . . . 7) | Next Hop Chaining Counter (NCC) defined in TS 33.501 [13]. |
| Secondary Next-Hop NH | M | | Security Key 9.3.1.87 | The NH together with the NCC is used to derive the security configuration as defined in TS 33.501 [13]. |

According to aspects of the disclosure where a successful context relocation has been performed, where the last serving gNB has (still) stored the UE context, i.e. within the Context Kept period, the 1st serving cell may be notified by the last serving cell of a new context relocation event occurrence to a 2nd serving gNB, and when the 1st Serving gNB may initiate a context relocation procedure to the Second serving gNB. Alternatively, the 1st serving gNB may initiate a reroute of the context relocation request while this is indicated to the 2nd serving gNB In some aspects, the UE may include a failure indication in the event of e.g. cell reselection, in which a 2nd Serving gNB may initiate a new context relocation procedure informing the last gNB or alternatively the 1st and last gNB, for when a new or updated context relocation procedure is initiated.

In some aspects, the 1st gNB may detect a SDT/RRCResume req. Failure to the last serving gNB upon which the last Serving gNB stores the UE context. Alternatively, the last serving gNB may stores the UE context until a SDT procedure success indication is received from the 1st Serving gNB.

In some aspects, an indication may be included in MsgA or Msg3 of the random access procedure carrying the second RRCResumeRequest message, i.e. the RRCResumeRequest message sent after the UE has done a cell re-selection. This indication may indicate that the UE has done a cell reselection after initiating SDT procedure in a first cell and which cell the UE did initiated the first SDT. When the gNB in the re-selected cell receives this indication, it may send two Retrieve UE context Requests messages to retrieve the UE context. A first Retrieve UE context Request is sent to the old anchor node (as in legacy) and a second Retrieve UE context Request is sent to the node where the UE initiated its first SDT procedure (as indicated in MsgA or Msg3). In some aspects, the indication may be carried in the RRCResumeRequest message as an RRC IE, or the indication may be carried as a MAC CE.

Aspects of the disclosure provide methods executed by UEs, the methods comprising: receiving a RRCRelease message containing plural (for example, two) sets of security parameters, e.g. the legacy Next Hop Chaining Count and Next-Hop NH and a second Secondary Next Hop Chaining Count and Secondary Next-Hop NH. In some aspects upon initiating a first RRCResume procedure in a first cell, the first set of security parameters may be used to encrypt the User plane data. In some aspects, upon initiating a second RRCResume procedure in a second cell, after re-selecting to the second cell, and without receiving a new RRCRelease message, the second set of security parameters may be used to encrypt the User plane data. In some aspects upon determining that UE and/or target NG-RAN node has been authenticated, the (retained copy of the) context and/or data may be removed from the original node(s).

Figure 8:
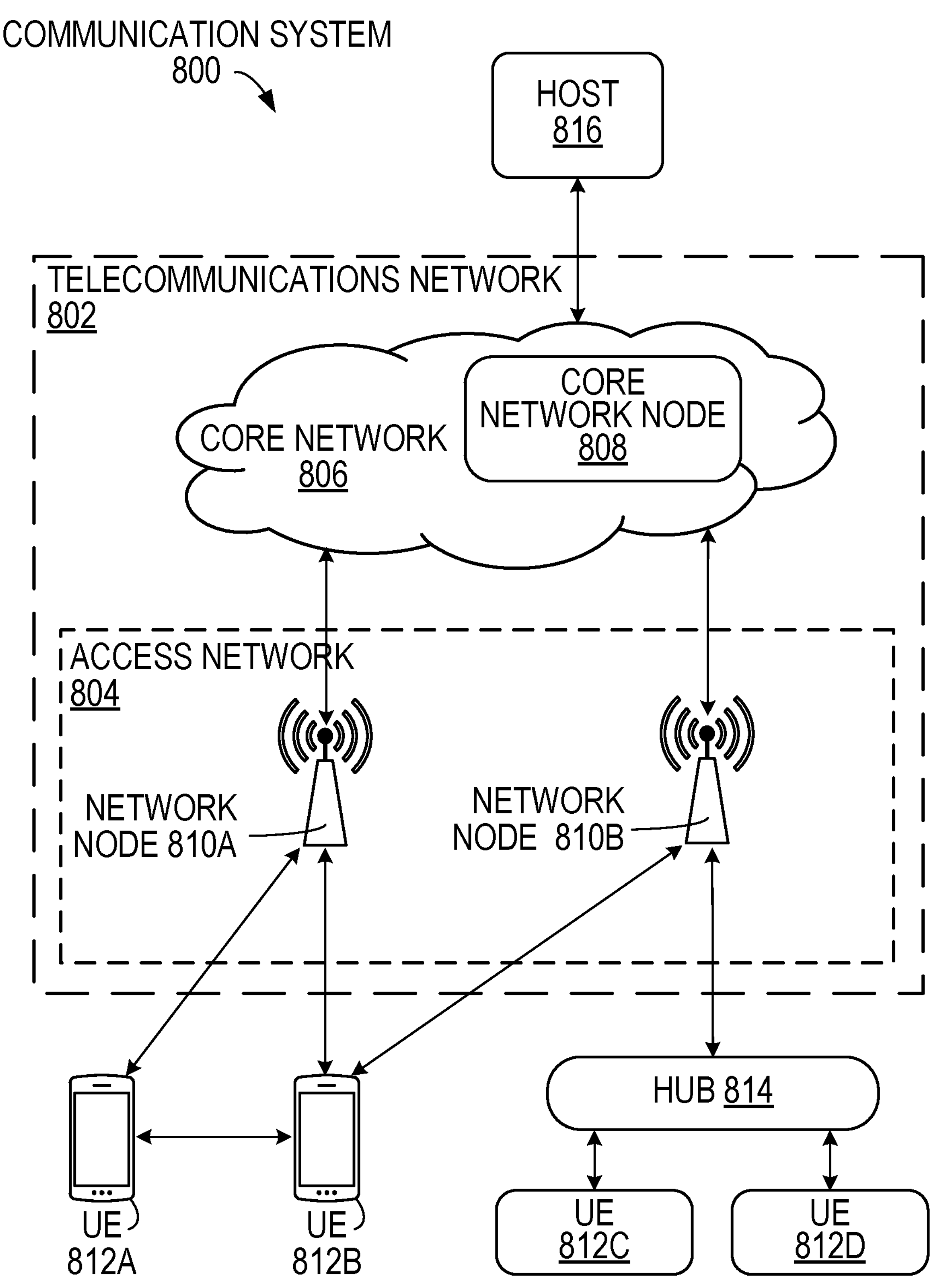
FIG. 8 shows an example of a communication system in accordance with some embodiments.

FIG. 8 shows an example of a communication system in accordance with some embodiments.

In the example, the communication system 800 includes a telecommunication network 802 that includes an access network 804, such as a radio access network (RAN), and a core network 806, which includes one or more core network nodes 808. The access network 804 includes one or more access network nodes, such as network nodes 810*a* and 810*b* (one or more of which may be generally referred to as network nodes 810), or any other similar $3^{rd}$ Generation Partnership Project (3GPP) access node or non-3GPP access point. The network nodes 810 facilitate direct or indirect connection of user equipment (UE), such as by connecting UEs 812*a*, 812*b*, 812*c*, and 812*d* (one or more of which may be generally referred to as UEs 812) to the core network 806 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 800 may include any number of wired or wireless networks, network nodes, UEs, and/or any other components or systems that may facilitate or participate in the communication of data and/or signals whether via wired or wireless connections. The communication system 800 may include and/or interface with any type of communication, telecommunication, data, cellular, radio network, and/or other similar type of system.

The UEs 812 may be any of a wide variety of communication devices, including wireless devices arranged, configured, and/or operable to communicate wirelessly with the network nodes 810 and other communication devices. Similarly, the network nodes 810 are arranged, capable, configured, and/or operable to communicate directly or indirectly with the UEs 812 and/or with other network nodes or equipment in the telecommunication network 802 to enable and/or provide network access, such as wireless network access, and/or to perform other functions, such as administration in the telecommunication network 802.

In the depicted example, the core network 806 connects the network nodes 810 to one or more hosts, such as host 816. These connections may be direct or indirect via one or more intermediary networks or devices. In other examples, network nodes may be directly coupled to hosts. The core network 806 includes one more core network nodes (e.g., core network node 808) that are structured with hardware and software components. Features of these components may be substantially similar to those described with respect to the UEs, network nodes, and/or hosts, such that the descriptions thereof are generally applicable to the corresponding components of the core network node 808. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 816 may be under the ownership or control of a service provider other than an operator or provider of the access network 804 and/or the telecommunication network 802, and may be operated by the service provider or on behalf of the service provider. The host 816 may host a variety of applications to provide one or more services. Examples of such applications include the provision of live and/or pre-recorded audio/video content, data collection services, for example, retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 800 of FIG. 8 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 802 is a cellular network that implements 3GPP standardized features. Accordingly, the telecommunications network 802 may support network slicing to provide different logical networks to different devices that are connected to the telecommunication network 802. For example, the telecommunications network 802 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 812 are configured to transmit and/or receive information without direct human interaction. For instance, a UE may be designed to transmit information to the access network 804 on a predetermined schedule, when triggered by an internal or external event, or in response to requests from the access network 804. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio—Dual Connectivity (EN-DC).

In the example illustrated in FIG. 8, the hub 814 communicates with the access network 804 to facilitate indirect communication between one or more UEs (e.g., UE 812*c* and/or 812*d*) and network nodes (e.g., network node 810*b*). In some examples, the hub 814 may be a controller, router, a content source and analytics node, or any of the other communication devices described herein regarding UEs. For example, the hub 814 may be a broadband router enabling access to the core network 806 for the UEs. As another example, the hub 814 may be a controller that sends commands or instructions to one or more actuators in the UEs. Commands or instructions may be received from the UEs, network nodes 810, or by executable code, script, process, or other instructions in the hub 814. As another example, the hub 814 may be a data collector that acts as temporary storage for UE data and, in some embodiments, may perform analysis or other processing of the data. As another example, the hub 814 may be a content source. For example, for a UE that is a VR headset, display, loudspeaker or other media delivery device, the hub 814 may retrieve VR assets, video, audio, or other media or data related to sensory information via a network node, which the hub 814 then provides to the UE either directly, after performing local processing, and/or after adding additional local content. In still another example, the hub 814 acts as a proxy server or orchestrator for the UEs, in particular in if one or more of the UEs are low energy IoT devices.

The hub 814 may have a constant/persistent or intermittent connection to the network node 810*b*. The hub 814 may also allow for a different communication scheme and/or schedule between the hub 814 and UEs (e.g., UE 812*c* and/or 812*d*), and between the hub 814 and the core network 806. In other examples, the hub 814 is connected to the core network 806 and/or one or more UEs via a wired connection. Moreover, the hub 814 may be configured to connect to an M2M service provider over the access network 804 and/or to another UE over a direct connection. In some scenarios, UEs may establish a wireless connection with the network nodes 810 while still connected via the hub 814 via a wired or wireless connection. In some embodiments, the hub 814 may be a dedicated hub—that is, a hub whose primary function is to route communications to/from the UEs from/to the network node 810*b*. In other embodiments, the hub 814 may be a non-dedicated hub—that is, a device which is capable of operating to route communications between the UEs and network node 810*b*, but which is additionally capable of operating as a communication start and/or end point for certain data channels.

Figure 9:
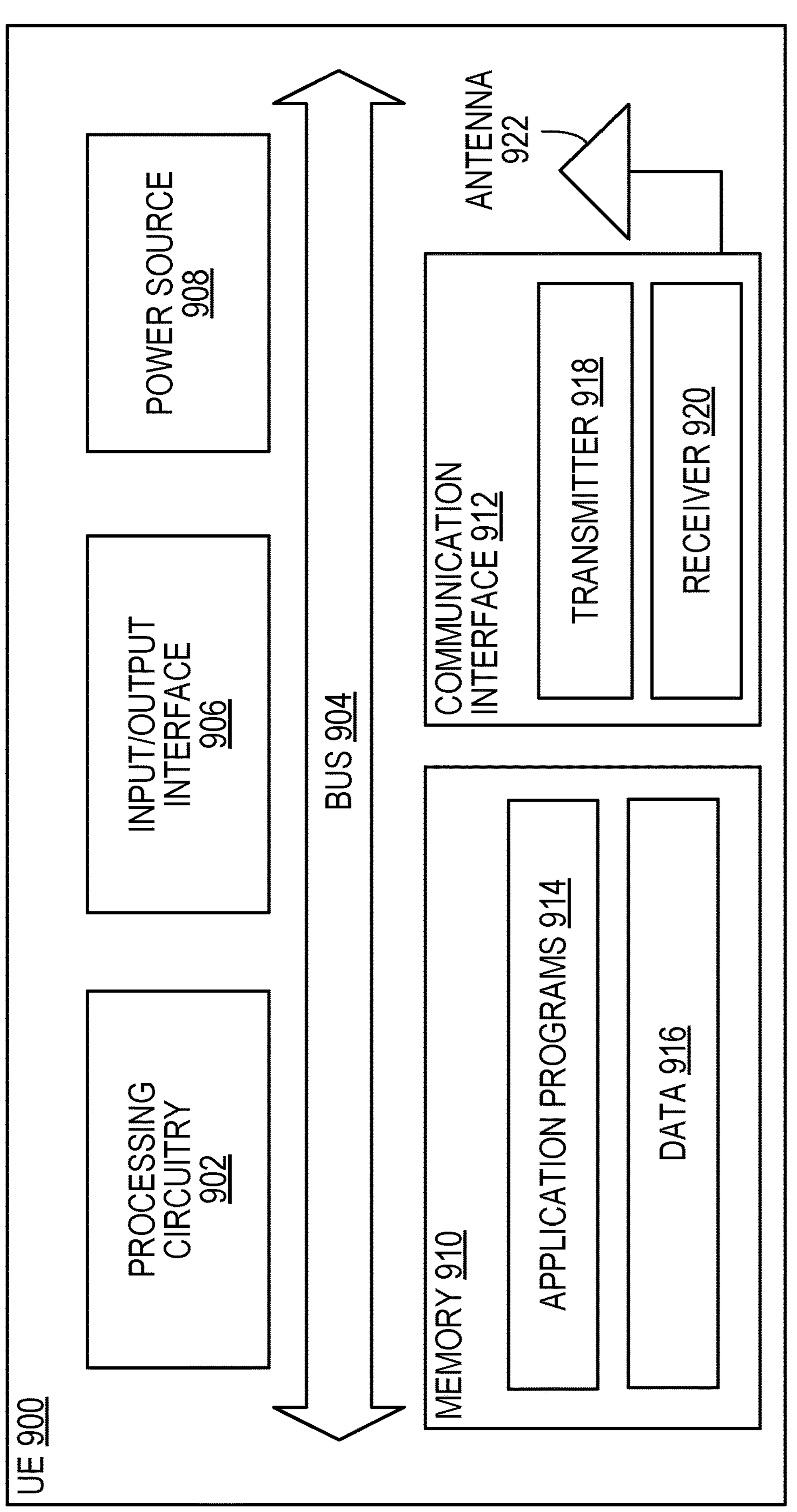
FIG. 9 shows a UE in accordance with some embodiments.

FIG. 9 shows a UE 900 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VOIP) phone, wireless local loop phone, desktop computer, personal digital assistant (PDA), wireless camera, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IOT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 900 includes processing circuitry 902 that is operatively coupled via a bus 904 to an input/output interface 906, a power source 908, a memory 910, a communication interface 912, and/or any other component, or any combination thereof. Certain UEs may utilize all or a subset of the components shown in FIG. 9. The level of integration between the components may vary from one UE to another UE. Further, certain UEs may contain multiple instances of a component, such as multiple processors, memories, transceivers, transmitters, receivers, etc.

The processing circuitry 902 is configured to process instructions and data and may be configured to implement any sequential state machine operative to execute instructions stored as machine-readable computer programs in the memory 910. The processing circuitry 902 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 902 may include multiple central processing units (CPUs). The processing circuitry 902 may be operable to provide, either alone or in conjunction with other UE 900 components, such as the memory 910, to provide UE 900 functionality. For example, the processing circuitry 902 may be configured to cause the UE 902 to perform the methods as described with reference to FIG. 2.

In the example, the input/output interface 906 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 900. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 908 is structured as a battery or battery pack. Other types of power sources, such as an external power source (e.g., an electricity outlet), photovoltaic device, or power cell, may be used. The power source 908 may further include power circuitry for delivering power from the power source 908 itself, and/or an external power source, to the various parts of the UE 900 via input circuitry or an interface such as an electrical power cable. Delivering power may be, for example, for charging of the power source 908. Power circuitry may perform any formatting, converting, or other modification to the power from the power source 908 to make the power suitable for the respective components of the UE 900 to which power is supplied.

The memory 910 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 910 includes one or more application programs 914, such as an operating system, web browser application, a widget, gadget engine, or other application, and corresponding data 916. The memory 910 may store, for use by the UE 900, any of a variety of various operating systems or combinations of operating systems.

The memory 910 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 910 may allow the UE 900 to access instructions, application programs and the like, stored on transitory or non-transitory memory media, to off-load data, or to upload data. An article of manufacture, such as one utilizing a communication system may be tangibly embodied as or in the memory 910, which may be or comprise a device-readable storage medium.

The processing circuitry 902 may be configured to communicate with an access network or other network using the communication interface 912. The communication interface 912 may comprise one or more communication subsystems and may include or be communicatively coupled to an antenna 922. The communication interface 912 may include one or more transceivers used to communicate, such as by communicating with one or more remote transceivers of another device capable of wireless communication (e.g., another UE or a network node in an access network). Each transceiver may include a transmitter 918 and/or a receiver 920 appropriate to provide network communications (e.g., optical, electrical, frequency allocations, and so forth). Moreover, the transmitter 918 and receiver 920 may be coupled to one or more antennas (e.g., antenna 922) and may share circuit components, software or firmware, or alternatively be implemented separately.

In some embodiments, communication functions of the communication interface 912 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 912, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or controls a robotic arm performing a medical procedure according to the received input.

A UE, when in the form of an Internet of Things (IOT) device, may be a device for use in one or more application domains, these domains comprising, but not limited to, city wearable technology, extended industrial application and healthcare. Non-limiting examples of such an IoT device are devices which are or which are embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence on the intended application of the IoT device in addition to other components as described in relation to the UE 900 shown in FIG. 9.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IOT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 10:
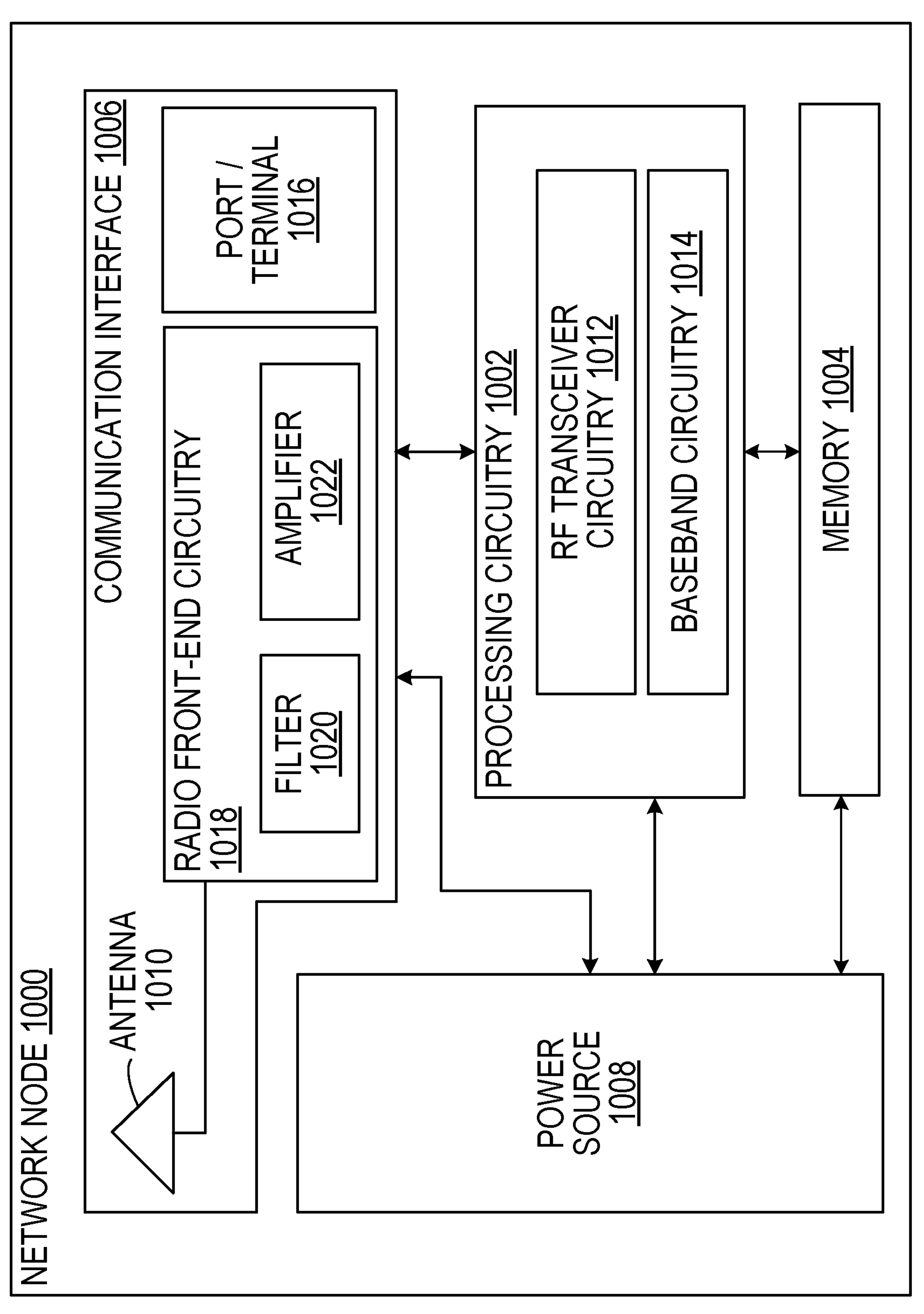
FIG. 10 shows a network node in accordance with some embodiments.

FIG. 10 shows a network node 1000 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1000 includes processing circuitry 1002, a memory 1004, a communication interface 1006, and a power source 1008, and/or any other component, or any combination thereof. The network node 1000 may be composed of multiple physically separate components (e.g., a NodeB component and a RNC component, or a BTS component and a BSC component, etc.), which may each have their own respective components. In certain scenarios in which the network node 1000 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1000 may be configured to support multiple radio access technologies (RATs). In such embodiments, some components may be duplicated (e.g., separate memory 1004 for different RATs) and some components may be reused (e.g., a same antenna 1010 may be shared by different RATs). The network node 1000 may also include multiple sets of the various illustrated components for different wireless technologies integrated into network node 1000, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1000.

The processing circuitry 1002 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1000 components, such as the memory 1004, to provide network node 1000 functionality. For example, the processing circuitry 1002 may be configured to cause the network node to perform the methods as described with reference to FIG. 3.

In some embodiments, the processing circuitry 1002 includes a system on a chip (SOC). In some embodiments, the processing circuitry 1002 includes one or more of radio frequency (RF) transceiver circuitry 1012 and baseband processing circuitry 1014. In some embodiments, the radio frequency (RF) transceiver circuitry 1012 and the baseband processing circuitry 1014 may be on separate chips (or sets of chips), boards, or units, such as radio units and digital units. In alternative embodiments, part or all of RF transceiver circuitry 1012 and baseband processing circuitry 1014 may be on the same chip or set of chips, boards, or units.

The memory 1004 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1002. The memory 1004 may store any suitable instructions, data, or information, including a computer program, software, an application including one or more of logic, rules, code, tables, and/or other instructions capable of being executed by the processing circuitry 1002 and utilized by the network node 1000. The memory 1004 may be used to store any calculations made by the processing circuitry 1002 and/or any data received via the communication interface 1006. In some embodiments, the processing circuitry 1002 and memory 1004 is integrated.

The communication interface 1006 is used in wired or wireless communication of signaling and/or data between a network node, access network, and/or UE. As illustrated, the communication interface 1006 comprises port(s)/terminal(s) 1016 to send and receive data, for example to and from a network over a wired connection. The communication interface 1006 also includes radio front-end circuitry 1018 that may be coupled to, or in certain embodiments a part of, the antenna 1010. Radio front-end circuitry 1018 comprises filters 1020 and amplifiers 1022. The radio front-end circuitry 1018 may be connected to an antenna 1010 and processing circuitry 1002. The radio front-end circuitry may be configured to condition signals communicated between antenna 1010 and processing circuitry 1002. The radio front-end circuitry 1018 may receive digital data that is to be sent out to other network nodes or UEs via a wireless connection. The radio front-end circuitry 1018 may convert the digital data into a radio signal having the appropriate channel and bandwidth parameters using a combination of filters 1020 and/or amplifiers 1022. The radio signal may then be transmitted via the antenna 1010. Similarly, when receiving data, the antenna 1010 may collect radio signals which are then converted into digital data by the radio front-end circuitry 1018. The digital data may be passed to the processing circuitry 1002. In other embodiments, the communication interface may comprise different components and/or different combinations of components.

In certain alternative embodiments, the network node 1000 does not include separate radio front-end circuitry 1018, instead, the processing circuitry 1002 includes radio front-end circuitry and is connected to the antenna 1010. Similarly, in some embodiments, all or some of the RF transceiver circuitry 1012 is part of the communication interface 1006. In still other embodiments, the communication interface 1006 includes one or more ports or terminals 1016, the radio front-end circuitry 1018, and the RF transceiver circuitry 1012, as part of a radio unit (not shown), and the communication interface 1006 communicates with the baseband processing circuitry 1014, which is part of a digital unit (not shown).

The antenna 1010 may include one or more antennas, or antenna arrays, configured to send and/or receive wireless signals. The antenna 1010 may be coupled to the radio front-end circuitry 1018 and may be any type of antenna capable of transmitting and receiving data and/or signals wirelessly. In certain embodiments, the antenna 1010 is separate from the network node 1000 and connectable to the network node 1000 through an interface or port.

The antenna 1010, communication interface 1006, and/or the processing circuitry 1002 may be configured to perform any receiving operations and/or certain obtaining operations described herein as being performed by the network node. Any information, data and/or signals may be received from a UE, another network node and/or any other network equipment. Similarly, the antenna 1010, the communication interface 1006, and/or the processing circuitry 1002 may be configured to perform any transmitting operations described herein as being performed by the network node. Any information, data and/or signals may be transmitted to a UE, another network node and/or any other network equipment.

The power source 1008 provides power to the various components of network node 1000 in a form suitable for the respective components (e.g., at a voltage and current level needed for each respective component). The power source 1008 may further comprise, or be coupled to, power management circuitry to supply the components of the network node 1000 with power for performing the functionality described herein. For example, the network node 1000 may be connectable to an external power source (e.g., the power grid, an electricity outlet) via an input circuitry or interface such as an electrical cable, whereby the external power source supplies power to power circuitry of the power source 1008. As a further example, the power source 1008 may comprise a source of power in the form of a battery or battery pack which is connected to, or integrated in, power circuitry. The battery may provide backup power should the external power source fail.

Embodiments of the network node 1000 may include additional components beyond those shown in FIG. 10 for providing certain aspects of the network node's functionality, including any of the functionality described herein and/or any functionality necessary to support the subject matter described herein. For example, the network node 1000 may include user interface equipment to allow input of information into the network node 1000 and to allow output of information from the network node 1000. This may allow a user to perform diagnostic, maintenance, repair, and other administrative functions for the network node 1000.

Figure 11:
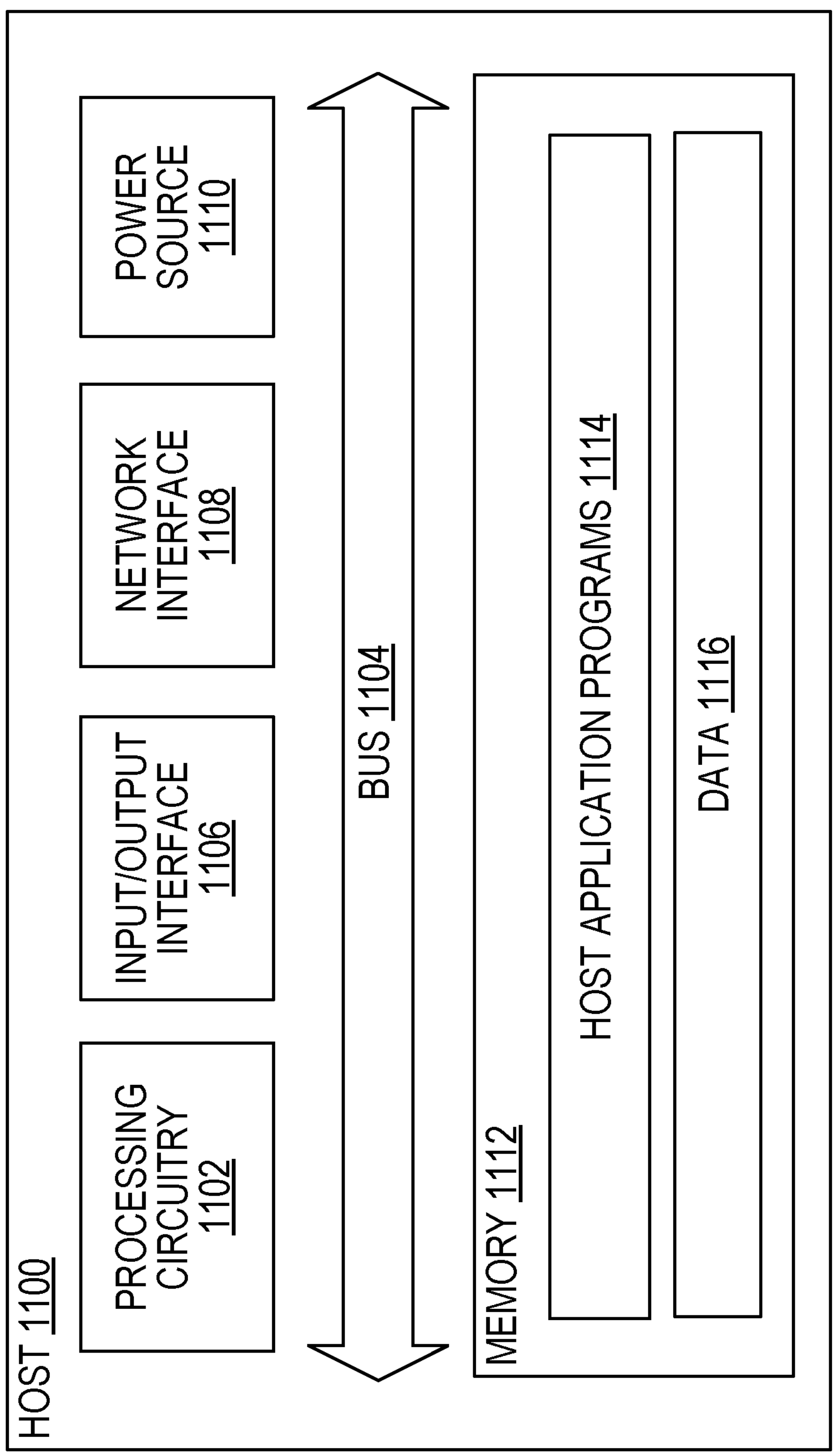
FIG. 11 is a block diagram of a host in accordance with some embodiments.

FIG. 11 is a block diagram of a host 1100, which may be an embodiment of the host 816 of FIG. 8, in accordance with various aspects described herein. As used herein, the host 1100 may be or comprise various combinations hardware and/or software, including a standalone server, a blade server, a cloud-implemented server, a distributed server, a virtual machine, container, or processing resources in a server farm. The host 1100 may provide one or more services to one or more UEs.

The host 1100 includes processing circuitry 1102 that is operatively coupled via a bus 1104 to an input/output interface 1106, a network interface 1108, a power source 1110, and a memory 1112. Other components may be included in other embodiments. Features of these components may be substantially similar to those described with respect to the devices of previous figures, such as FIGS. 9 and 10, such that the descriptions thereof are generally applicable to the corresponding components of host 1100.

The memory 1112 may include one or more computer programs including one or more host application programs 1114 and data 1116, which may include user data, e.g., data generated by a UE for the host 1100 or data generated by the host 1100 for a UE. Embodiments of the host 1100 may utilize only a subset or all of the components shown. The host application programs 1114 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1114 may also provide for user authentication and licensing checks and may periodically report health, routes, and content availability to a central node, such as a device in or on the edge of a core network. Accordingly, the host 1100 may select and/or indicate a different host for over-the-top services for a UE. The host application programs 1114 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 12:
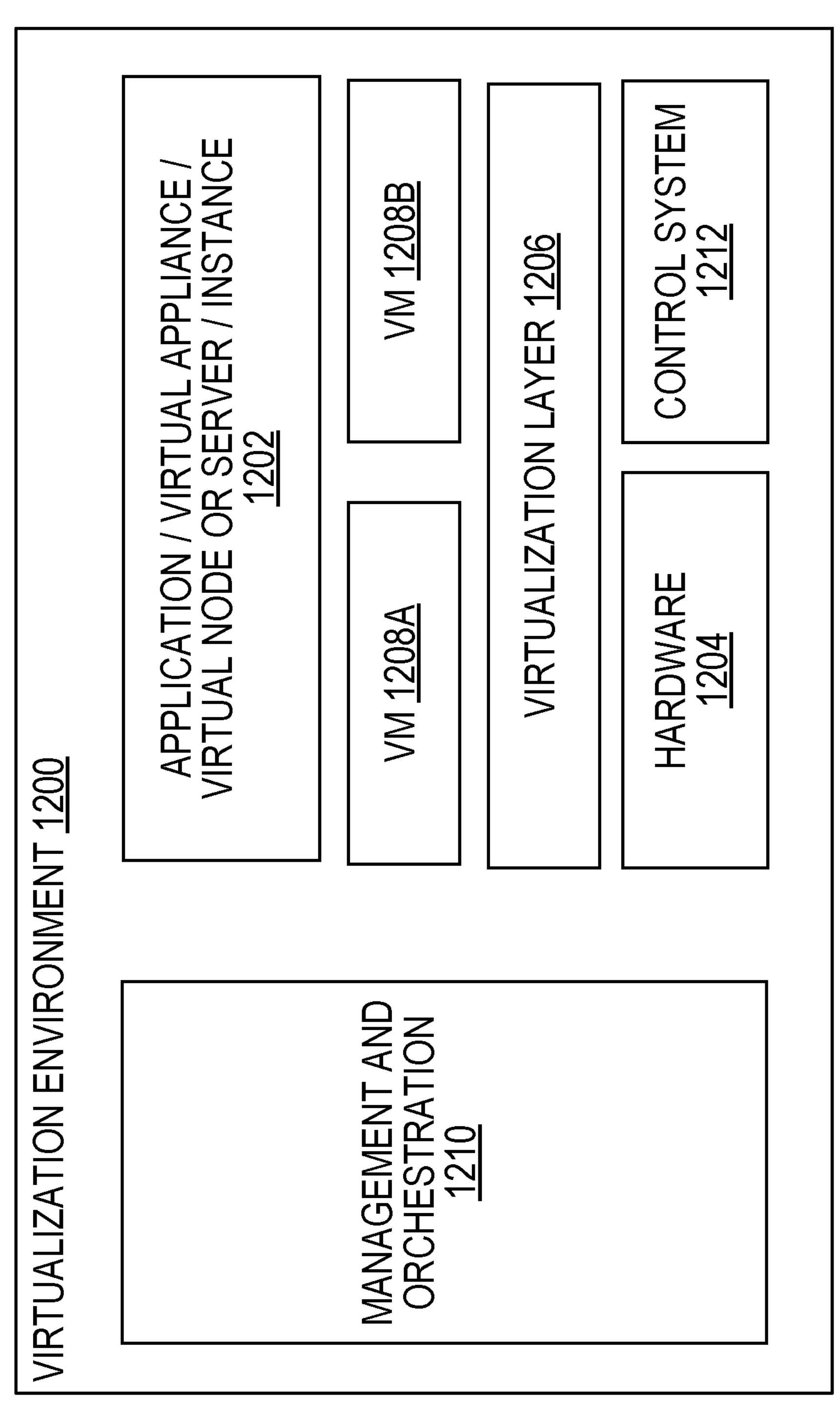
FIG. 12 is a block diagram of a virtualization environment in accordance with some embodiments.

FIG. 12 is a block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1200 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1202 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 1204 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 1206 (also referred to as hypervisors or virtual machine monitors (VMMs)), provide VMs 1208*a* and 1208*b* (one or more of which may be generally referred to as VMs 1208), and/or perform any of the functions, features and/or benefits described in relation with some embodiments described herein. The virtualization layer 1206 may present a virtual operating platform that appears like networking hardware to the VMs 1208.

The VMs 1208 comprise virtual processing, virtual memory, virtual networking or interface and virtual storage, and may be run by a corresponding virtualization layer 1206. Different embodiments of the instance of a virtual appliance 1202 may be implemented on one or more of VMs 1208, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1208 may be a software implementation of a physical machine that runs programs as if they were executing on a physical, non-virtualized machine. Each of the VMs 1208, and that part of hardware 1204 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1208 on top of the hardware 1204 and corresponds to the application 1202.

Hardware 1204 may be implemented in a standalone network node with generic or specific components. Hardware 1204 may implement some functions via virtualization. Alternatively, hardware 1204 may be part of a larger cluster of hardware (e.g. such as in a data center or CPE) where many hardware nodes work together and are managed via management and orchestration 1210, which, among others, oversees lifecycle management of applications 1202. In some embodiments, hardware 1204 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1212 which may alternatively be used for communication between hardware nodes and radio units.

Figure 13:
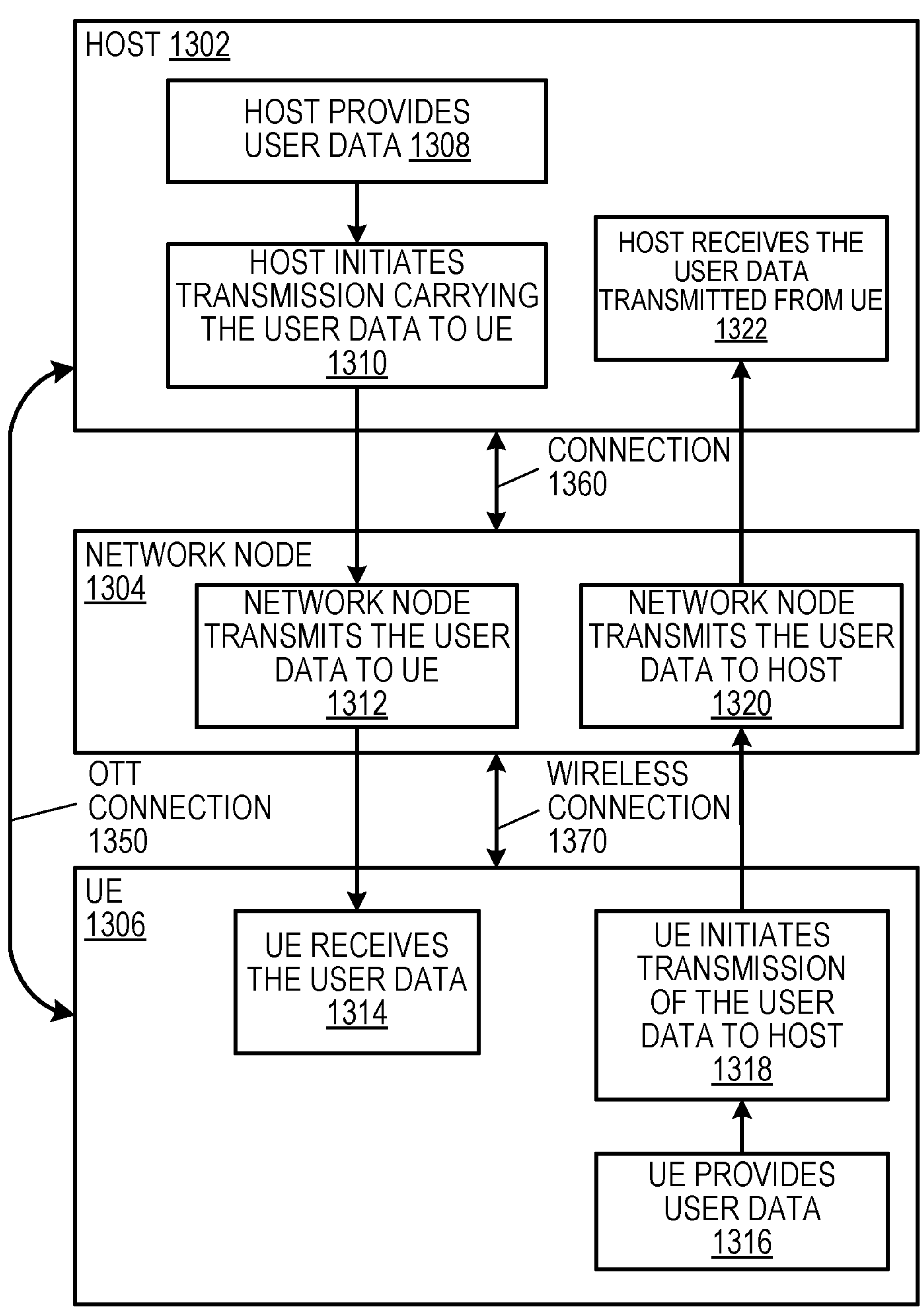
FIG. 13 is a communication diagram of a host communicating via a network node with a UE over a partially wireless connection in accordance with some embodiments.

FIG. 13 shows a communication diagram of a host 1302 communicating via a network node 1304 with a UE 1306 over a partially wireless connection in accordance with some embodiments. Example implementations, in accordance with various embodiments, of the UE (such as a UE 812*a* of FIG. 8 and/or UE 900 of FIG. 9), network node (such as network node 810*a* of FIG. 8 and/or network node 1000 of FIG. 10), and host (such as host 816 of FIG. 8 and/or host 1100 of FIG. 11) discussed in the preceding paragraphs will now be described with reference to FIG. 13.

Like host 1100, embodiments of host 1302 include hardware, such as a communication interface, processing circuitry, and memory. The host 1302 also includes software, which is stored in or accessible by the host 1302 and executable by the processing circuitry. The software includes a host application that may be operable to provide a service to a remote user, such as the UE 1306 connecting via an over-the-top (OTT) connection 1350 extending between the UE 1306 and host 1302. In providing the service to the remote user, a host application may provide user data which is transmitted using the OTT connection 1350.

The network node 1304 includes hardware enabling it to communicate with the host 1302 and UE 1306. The connection 1360 may be direct or pass through a core network (like core network 806 of FIG. 8) and/or one or more other intermediate networks, such as one or more public, private, or hosted networks. For example, an intermediate network may be a backbone network or the Internet.

The UE 1306 includes hardware and software, which is stored in or accessible by UE 1306 and executable by the UE's processing circuitry. The software includes a client application, such as a web browser or operator-specific "app" that may be operable to provide a service to a human or non-human user via UE 1306 with the support of the host 1302. In the host 1302, an executing host application may communicate with the executing client application via the OTT connection 1350 terminating at the UE 1306 and host 1302. In providing the service to the user, the UE's client application may receive request data from the host's host application and provide user data in response to the request data. The OTT connection 1350 may transfer both the request data and the user data. The UE's client application may interact with the user to generate the user data that it provides to the host application through the OTT connection 1350.

The OTT connection 1350 may extend via a connection 1360 between the host 1302 and the network node 1304 and via a wireless connection 1370 between the network node 1304 and the UE 1306 to provide the connection between the host 1302 and the UE 1306. The connection 1360 and wireless connection 1370, over which the OTT connection 1350 may be provided, have been drawn abstractly to illustrate the communication between the host 1302 and the UE 1306 via the network node 1304, without explicit reference to any intermediary devices and the precise routing of messages via these devices.

As an example of transmitting data via the OTT connection 1350, in step 1308, the host 1302 provides user data, which may be performed by executing a host application. In some embodiments, the user data is associated with a particular human user interacting with the UE 1306. In other embodiments, the user data is associated with a UE 1306 that shares data with the host 1302 without explicit human interaction. In step 1310, the host 1302 initiates a transmission carrying the user data towards the UE 1306. The host 1302 may initiate the transmission responsive to a request transmitted by the UE 1306. The request may be caused by human interaction with the UE 1306 or by operation of the client application executing on the UE 1306. The transmission may pass via the network node 1304, in accordance with the teachings of the embodiments described throughout this disclosure. Accordingly, in step 1312, the network node 1304 transmits to the UE 1306 the user data that was carried in the transmission that the host 1302 initiated, in accordance with the teachings of the embodiments described throughout this disclosure. In step 1314, the UE 1306 receives the user data carried in the transmission, which may be performed by a client application executed on the UE 1306 associated with the host application executed by the host 1302.

In some examples, the UE 1306 executes a client application which provides user data to the host 1302. The user data may be provided in reaction or response to the data received from the host 1302. Accordingly, in step 1316, the UE 1306 may provide user data, which may be performed by executing the client application. In providing the user data, the client application may further consider user input received from the user via an input/output interface of the UE 1306. Regardless of the specific manner in which the user data was provided, the UE 1306 initiates, in step 1318, transmission of the user data towards the host 1302 via the network node 1304. In step 1320, in accordance with the teachings of the embodiments described throughout this disclosure, the network node 1304 receives user data from the UE 1306 and initiates transmission of the received user data towards the host 1302. In step 1322, the host 1302 receives the user data carried in the transmission initiated by the UE 1306.

One or more of the various embodiments improve the performance of OTT services provided to the UE 1306 using the OTT connection 1350, in which the wireless connection 1370 forms the last segment. More precisely, the teachings of these embodiments may improve the exchange of security parameters during UE handover and thereby provide benefits such as improved security during handover and reductions in the instances of handover failure.

In an example scenario, factory status information may be collected and analyzed by the host 1302. As another example, the host 1302 may process audio and video data which may have been retrieved from a UE for use in creating maps. As another example, the host 1302 may collect and analyze real-time data to assist in controlling vehicle congestion (e.g., controlling traffic lights). As another example, the host 1302 may store surveillance video uploaded by a UE. As another example, the host 1302 may store or control access to media content such as video, audio, VR or AR which it can broadcast, multicast or unicast to UEs. As other examples, the host 1302 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1350 between the host 1302 and UE 1306, in response to variations in the measurement results. The measurement procedure and/or the network functionality for reconfiguring the OTT connection may be implemented in software and hardware of the host 1302 and/or UE 1306. In some embodiments, sensors (not shown) may be deployed in or in association with other devices through which the OTT connection 1350 passes; the sensors may participate in the measurement procedure by supplying values of the monitored quantities exemplified above, or supplying values of other physical quantities from which software may compute or estimate the monitored quantities. The reconfiguring of the OTT connection 1350 may include message format, retransmission settings, preferred routing etc.; the reconfiguring need not directly alter the operation of the network node 1304. Such procedures and functionalities may be known and practiced in the art. In certain embodiments, measurements may involve proprietary UE signaling that facilitates measurements of throughput, propagation times, latency and the like, by the host 1302. The measurements may be implemented in that software causes messages to be transmitted, in particular empty or 'dummy' messages, using the OTT connection 1350 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

The following numbered embodiments provide additional information on the disclosure.

1. A method performed by a user equipment, UE, for UE context transitions in cell reselection, the method comprising:
   obtaining plural sets of security parameters;
   initiating a first Radio Resource Control, RRC, connection resume procedure using a first set of security parameters from among the plural sets of security parameters; and
   initiating a second RRC connection resume procedure using a second set of security parameters from among the plural sets of security parameters.
2. The method of embodiment 1, wherein the UE obtains the plural sets of security parameters in a RRC release message.
3. The method of embodiment 2, wherein each of the plural sets of security parameters comprises a Next Hop Chaining Count and a Next Hop parameter
4. The method of embodiment 1, wherein each of the sets of security parameters comprises a Small Data Transmission, SDT, New Radio base station, gNB, key, SDT_KgNB.
5. The method of embodiment 4, wherein the UE obtains the SDT_KgNBs by calculating the SDT_KgNBs.
6. The method of embodiment 5, wherein the UE calculates the SDT_KGNBs based on at least one of:
   a currently active access stratum, AS, security context;
   a property of a source NG-RAN node;
   a property of a target NG-RAN node; and
   an ongoing SDT communication.
7. The method of any preceding embodiment, wherein the security parameters comprise an authentication code.
8 The method of embodiment 7, wherein the authentication code is a shortResume Message Authentication Code—Integrity, MAC-I.
9. The method of any preceding embodiment, wherein the first set of security parameters are used to encrypt data in the first RRC connection resume procedure, and the second set of security parameters are used to encrypt data in the second RRC connection resume procedure.
10. The method of any preceding embodiment, wherein the second RRC connection resume procedure is initiated without receiving a RRC release message in relation to the first RRC connection resume procedure.
11. The method of any of the previous embodiments, further comprising:
   providing user data; and
   forwarding the user data to a host via the transmission to the network node.
12. A method performed by a new serving network node for User Equipment, UE, context transitions in cell reselection, the method comprising:
   receiving a Radio Resource Control, RRC, connection resume message from a UE;
   transmitting a retrieve UE context request to a last serving network node, requesting the retrieval of the UE access stratum context; and
   receiving a response from the last serving network node to the retrieve UE context request.
13. The method of embodiment 12, wherein the Radio Resource Control, RRC, connection resume message comprises a request for resumption of a suspended RRC connection, or a request to perform a Radio Access Network based notification area, RNA, update.
14. The method of any of embodiments 12 and 13, wherein the retrieve UE context request sent by the new serving network node is the first request to retrieve the UE access stratum context received by the last serving network node.
15. The method of embodiment 14, wherein the retrieve UE context request sent by the new serving network node comprises a request for the last serving network node to keep the UE context.
16. The method of embodiment 14 or 15, wherein the response from the last serving network node is an acceptance of the UE context retrieval that the new serving network node has requested.
17. The method of embodiment 16, wherein the response from the last serving network node is an acceptance of the UE context retrieval that the new serving network node has requested and a rejection of the request for the last serving network node to keep the UE context.
18. The method of any of embodiments 14 and 15, wherein the response from the last serving network node is a rejection of the retrieve UE context request.

19. The method of any of embodiments 14 to 17, wherein the response from the last serving network node comprises a set of security parameters.
20. The method of any of embodiments 12 and 13, wherein the retrieve UE context request sent by the new serving network node is received by the last serving network node subsequently to an earlier request to retrieve the UE access stratum context from a further new serving network node.
21. The method of embodiment 20, wherein the retrieve UE context request comprises an Inactive Radio Network Temporary Identity, I-RNTI, and wherein the earlier request comprised the same I-RNTI.
22. The method of any of embodiments 20 and 21, wherein the response from the last serving network node is an acceptance of the UE context retrieval that the new serving network node has requested.
23. The method of any of embodiments 20 and 21, wherein the response from the last serving network node is a rejection of the retrieve UE context request.
24. The method of embodiment 22, wherein the response from the last serving network node comprises security parameters.
25. A method performed by a last serving network node for User Equipment, UE, context transitions in cell reselection, the method comprising;
    receiving a retrieve UE context request from a new serving network node, requesting the retrieval of the UE access stratum context; and
    responding to the retrieve UE context request.
26. The method of embodiment 25, wherein the last serving network node accepts the UE context retrieval request, and responds with an acknowledgement.
27. The method of embodiment 26, wherein the last serving network node provides security parameters to the new serving network node.
28. The method of any of embodiments 25 to 27, wherein the retrieve UE context request comprises a request for the last serving network node to keep the UE context.
29. The method of embodiment 28, wherein the last serving network node accepts the request to keep the UE context, and keeps the UE context for a period of time indicated by the request.
30. The method of embodiment 28, wherein the last serving network node rejects the request to keep the UE context.
31. The method of embodiment 25, wherein the last serving network node rejects the retrieve UE context request, and sends a failure message to the new serving network node.
32. A method performed by a Core Network, CN, node, the method comprising: transmitting a message to a network node comprising security parameters.
33. The method of embodiment 32, wherein the message comprises plural sets of security parameters and is transmitted in response to a request for security information from the network node.
34. The method of embodiment 33, wherein the request for security information is a Path Switch Request, UE context Suspend, or UE Context Resume message.
35. The method of any of embodiments 32 to 34, wherein the message comprises plural sets of security parameters and is a Handover Request, Path Switch Request Acknowledge, UE context Suspend Response, or UE Context Resume Response message.
36. The method of embodiment 32, wherein the message providing the security parameters is sent during Core Network paging.
37. The method of any of embodiments 32 to 36, wherein the CN node is an AMF.
38. The method of any of embodiments 12 to 37, further comprising:
    obtaining user data; and
    forwarding the user data to a host or a user equipment.
39. A UE for UE context transitions in cell reselection, comprising:
    processing circuitry configured to cause the user equipment to perform any of the steps of any of embodiments 1 to 11; and
    power supply circuitry configured to supply power to the processing circuitry.
40. A network node for facilitating user equipment, UE, context transitions in cell reselection, the network node comprising:
    processing circuitry configured to cause the network node to perform any of the steps of any of embodiments 12 to 38;
    power supply circuitry configured to supply power to the processing circuitry.
41. A UE for UE, context transitions in cell reselection, the UE comprising:
    an antenna configured to send and receive wireless signals;
    radio front-end circuitry connected to the antenna and to processing circuitry, and configured to condition signals communicated between the antenna and the processing circuitry;
    the processing circuitry being configured to perform any of the steps of any of embodiments 1 to 11;
    an input interface connected to the processing circuitry and configured to allow input of information into the UE to be processed by the processing circuitry;
    an output interface connected to the processing circuitry and configured to output information from the UE that has been processed by the processing circuitry; and
    a battery connected to the processing circuitry and configured to supply power to the UE.
42. A host configured to operate in a communication system to provide an over-the-top (OTT) service, the host comprising:
    processing circuitry configured to provide user data; and
    a network interface configured to initiate transmission of the user data to a cellular network for transmission to a user equipment (UE),
    wherein the UE comprises a communication interface and processing circuitry, the communication interface and processing circuitry of the UE being configured to perform any of the steps of any of embodiments 1 to 11 to receive the user data from the host.
43. The host of embodiment 42, wherein the cellular network further includes a network node configured to communicate with the UE to transmit the user data to the UE from the host.
44. The host of any of embodiments 42 to 43, wherein:
    the processing circuitry of the host is configured to execute a host application, thereby providing the user data; and the host application is configured to interact with a client application executing on the UE, the client application being associated with the host application.

45. A method implemented by a host operating in a communication system that further includes a network node and a user equipment (UE), the method comprising:

providing user data for the UE; and initiating a transmission carrying the user data to the UE via a cellular network comprising the network node, wherein the UE performs any of the operations of any of embodiments 1 to 11 to receive the user data from the host.

46. The method of embodiment 45, further comprising:

at the host, executing a host application associated with a client application executing on the UE to receive the user data from the UE.

47. The method of embodiment 46, further comprising:

at the host, transmitting input data to the client application executing on the UE, the input data being provided by executing the host application, wherein the user data is provided by the client application in response to the input data from the host application.

48. A host configured to operate in a communication system to provide an over-the-top (OTT) service, the host comprising:

processing circuitry configured to provide user data; and a network interface configured to initiate transmission of the user data to a cellular network for transmission to a user equipment (UE), wherein the UE comprises a communication interface and processing circuitry, the communication interface and processing circuitry of the UE being configured to perform any of the steps of any of embodiments 1 to 11 to transmit the user data to the host.

49. The host of embodiment 48, wherein the cellular network further includes a network node configured to communicate with the UE to transmit the user data from the UE to the host.

50. The host of any of embodiments 48 and 49, wherein:

the processing circuitry of the host is configured to execute a host application, thereby providing the user data; and the host application is configured to interact with a client application executing on the UE, the client application being associated with the host application.

51. A method implemented by a host configured to operate in a communication system that further includes a network node and a user equipment (UE), the method comprising:

at the host, receiving user data transmitted to the host via the network node by the UE, wherein the UE performs any of the steps of any embodiment 1 to 11 to transmit the user data to the host.

52. The method of embodiment 51, further comprising:

at the host, executing a host application associated with a client application executing on the UE to receive the user data from the UE.

53. The method of embodiment 52, further comprising:

at the host, transmitting input data to the client application executing on the UE, the input data being provided by executing the host application, wherein the user data is provided by the client application in response to the input data from the host application.

54. A host configured to operate in a communication system to provide an over-the-top (OTT) service, the host comprising:

processing circuitry configured to provide user data; and a network interface configured to initiate transmission of the user data to a network node in a cellular network for transmission to a user equipment (UE), the network node having a communication interface and processing circuitry, the processing circuitry of the network node configured to perform any of the operations of any embodiments 12 to 38 to transmit the user data from the host to the UE.

55. The host of embodiment 54, wherein:

the processing circuitry of the host is configured to execute a host application that provides the user data; and the UE comprises processing circuitry configured to execute a client application associated with the host application to receive the transmission of user data from the host.

56. A method implemented in a host configured to operate in a communication system that further includes a network node and a user equipment (UE), the method comprising:

providing user data for the UE; and initiating a transmission carrying the user data to the UE via a cellular network comprising the network node, wherein the network node performs any of the operations of any embodiments 1 to 11 to transmit the user data from the host to the UE.

57. The method of embodiment 56, further comprising, at the network node, transmitting the user data provided by the host for the UE.

58. The method of any of embodiments 56 and 57, wherein the user data is provided at the host by executing a host application that interacts with a client application executing on the UE, the client application being associated with the host application.

59. A communication system configured to provide an over-the-top service, the communication system comprising:

a host comprising:

processing circuitry configured to provide user data for a user equipment (UE), the user data being associated with the over-the-top service; and a network interface configured to initiate transmission of the user data toward a cellular network node for transmission to the UE, the network node having a communication interface and processing circuitry, the processing circuitry of the network node configured to perform any of the operations of any of embodiments 12 to 38 to transmit the user data from the host to the UE.

60. The communication system of embodiment 59, further comprising:

the network node; and/or the user equipment.

61. A host configured to operate in a communication system to provide an over-the-top (OTT) service, the host comprising:

processing circuitry configured to initiate receipt of user data; and a network interface configured to receive the user data from a network node in a cellular network, the network node having a communication interface and processing circuitry, the processing circuitry of the network node configured to perform any of the operations of any of embodiments 12 to 38 to receive the user data from a user equipment (UE) for the host.

62. The host of any of embodiments 60 and 61, wherein:

the processing circuitry of the host is configured to execute a host application, thereby providing the user data; and the host application is configured to interact with a client application executing on the UE, the client application being associated with the host application.

63. The host of the any of embodiments 61 and 62, wherein the initiating receipt of the user data comprises requesting the user data.

64. A method implemented by a host configured to operate in a communication system that further includes a network node and a user equipment (UE), the method comprising:

at the host, initiating receipt of user data from the UE, the user data originating from a transmission which the network node has received from the UE, wherein the network node performs any of the steps of any of embodiments 12 to 38 to receive the user data from the UE for the host.

65. The method of embodiment 64, further comprising at the network node, transmitting the received user data to the host.

The invention claimed is:

1. A method performed by a user equipment (UE), the method comprising:

receiving a Radio Resource Control (RRC) release message from a serving cell, releasing the UE to an RRC non-connected state such that the serving cell becomes a last serving cell and wherein the RRC release message indicates plural sets of Access Stratum (AS) security parameters;

while operating in the RRC non-connected state, initiating a first Small Data Transmission (SDT) procedure in a first cell by transmitting a first RRC resume request message to the first cell, and using a first set of AS security parameters from among the plural sets of AS security parameters in association with the first SDT procedure, the first cell being distinct from the last serving cell;

after transmitting the first RRC resume request message and before completing the first SDT procedure, performing a cell reselection to a second cell, the second cell being distinct from the last serving cell; and initiating a second SDT procedure in the second cell by transmitting a second RRC resume request message to the second cell, and using a second set of AS security parameters from among the plural sets of security parameters in association with the second SDT procedure;

wherein the UE includes an identifier of the first cell in the second RRC resume request message, enabling the second cell to retrieve a UE context from the first cell.

2. The method of claim 1, wherein the second RRC resume message indicates that the UE performed a cell reselection after initiating the first SDT procedure in the first cell.

3. The method of claim 2, wherein each of the plural sets of AS security parameters comprises a Next Hop Chaining Count and a Next Hop parameter.

4. The method of claim 1, wherein each of the sets of AS security parameters comprises a Small Data Transmission New Radio base station key (SDT_KgNB).

5. The method of claim 4, wherein the UE obtains the SDT_KgNBs by calculating the SDT_KgNBs.

6. The method of claim 5, wherein the UE calculates the SDT_KgNBs based on at least one of:

a currently active AS security context;

a property of a source Next Generation Radio Access Network (NG-RAN) node;

a property of a target NG-RAN node; and an ongoing SDT communication.

7. The method of claim 1, wherein the AS security parameters comprise an authentication code.

8. The method of claim 7, wherein the authentication code is a shortResume Message Authentication Code-Integrity, MAC-I.

9. The method of claim 1, wherein the first set of AS security parameters are used to encrypt data in the first SDT procedure, and the second set of AS security parameters are used to encrypt data in the second SDT procedure.

10. A user equipment (UE) comprising:

processing circuitry configured to control the UE to:

receive a Radio Resource Control (RRC) release message from a serving cell, releasing the UE to an RRC non-connected state such that the serving cell becomes a last serving cell, and wherein the RRC release message indicates plural sets of Access Stratum (AS) security parameters;

while operating in the RRC non-connected state, initiate a first Small Data Transmission (SDT) procedure in a first cell by transmitting a first RRC resume request message to the first cell, and using a first set of AS security parameters from among the plural sets of AS security parameters in association with the first SDT procedure, the first cell being distinct from the last serving cell;

after transmitting the first RRC resume request message and before completing the first SDT procedure, perform reselection to a second cell, the second cell being distinct from the last serving cell; and initiate a second SDT procedure in the second cell by transmitting a second RRC resume request message to the second cell, and using a second set of AS security parameters from among the plural sets of AS security parameters in association with the second SDT procedure, wherein the UE includes an identifier of the first cell in the second RRC resume request message, enabling the second cell to retrieve a UE context from the first cell; and power supply circuitry configured to supply power to the processing circuitry.

* * * * *